United States Patent
Li et al.

(10) Patent No.: US 7,720,178 B2
(45) Date of Patent: May 18, 2010

(54) METHOD OF DIRECT RF DIGITIZATION FOR MULTIPLE GNSS SYSTEM BANDS AND RECEIVER USING THE SAME

(75) Inventors: Kuan-i Li, Kaohsiung (TW); Jui-Ming Wei, Taichung (TW); Chun-nan Chen, Taipei (TW)

(73) Assignee: MEDIATEK Inc., Hsin-Chu (TW)

( * ) Notice: Subject to any disclaimer, the term of this patent is extended or adjusted under 35 U.S.C. 154(b) by 859 days.

(21) Appl. No.: 11/464,089

(22) Filed: Aug. 11, 2006

(65) Prior Publication Data

US 2008/0037687 A1 Feb. 14, 2008

(51) Int. Cl.
H03K 9/00 (2006.01)
H03D 7/16 (2006.01)
(52) U.S. Cl. ...................... 375/316; 455/131
(58) Field of Classification Search ............ 375/316, 375/340, 346, 350; 455/131, 136–137
See application file for complete search history.

(56) References Cited

U.S. PATENT DOCUMENTS

| 5,280,636 A * | 1/1994 | Kelley et al. ............ 455/131 |
| 5,602,847 A * | 2/1997 | Pagano et al. ............ 370/484 |
| 6,922,449 B1 * | 7/2005 | Bristow .................... 375/316 |
| 7,035,348 B2 * | 4/2006 | Suzuki et al. ............ 375/316 |
| 7,200,377 B2 * | 4/2007 | Whikehart et al. ........ 455/307 |
| 2002/0187762 A1 | 12/2002 | Whikehart et al. |

FOREIGN PATENT DOCUMENTS

WO 96/21292 7/1996

OTHER PUBLICATIONS

Mark L. Psiaki, Steven P. Powell, Hee Jung, and Paul M. Kintner; "Design and Practical Implementation of Multifrequency RF Front Ends Using Direct RF Sampling", IEEE Transactions on Microwave Theory and Techniques, vol. 53, No. 10, Oct. 2005.

* cited by examiner

*Primary Examiner*—Khanh C Tran

(57) ABSTRACT

A method of direct RF digitization for multiple RF signal bands such GNSS or wireless communication signal bands and a receiver using the method. By using the method, an optimal sampling frequency to be used in direct RF digitization for signals of multiple RF signal bands can be easily obtained. According to the present invention, one or more of the RF signal bands are selected to be shifted to target band(s). By doing so, the optimal sampling frequency can be easily calculated. Then the obtained sampling frequency is used in executing the direct RF digitization.

14 Claims, 4 Drawing Sheets

METHOD OF DIRECT RF DIGITIZATION FOR MULTIPLE GNSS SYSTEM BANDS AND RECEIVER USING THE SAME

TECHNICAL FIELD OF THE INVENTION

The present invention relates to direct RF digitization, more particularly, to a method of direct RF digitization for multiple RF (radio frequency) bands, such as GNSS (Global Navigation Satellite System) bands and other wireless communication systems, such as mobile phone and DVBH (Digital Video Broadcast—Handheld) and the like. In this method, an optimal sampling frequency used in direct RF digitization of the multiple signal bands can be easily obtained. The present invention further relates to a receiver with an RF front end using the method of direct RF digitization.

BACKGROUND OF THE INVENTION

Nowadays, more than one Global Navigation Satellite System (GNSS) is available, which includes GPS, Galileo and GLONASS. A receiver supporting multi-specification LBS (location based service), wireless multimedia communication and broadcasting signals is becoming an expectation. Take multi-specification LBS as an example, such a receiver able to support multi-mode receiving for GNSS signals can enhance locating precision and access to more services. Among the GNSS systems, different signal frequency bands support different services. As more and more bands need to be supported, band overlapping occurs.

FIG. 1 generally shows frequency band distribution of GPS and Galileo systems. GPS is the U.S. navigation satellite system, which is a network of satellites continuously transmits high-frequency radio signals. The signals carry time and distance information that is receivable by a GPS receiver, so that a user can pinpoint the position thereof on the earth. Galileo, the emerging European satellite navigation system, offers higher signal power and more robust modulation that will enable users to receive weak signals even in difficult environments. When combined, Galileo and GPS will offer twice the number of satellite sources as currently available. This provides redundancy as well as greater availability for the user. As shown, the combination of GPS and Galileo basically has four bands, excluding SAR (Safe and Rescue) service. GPS and Galileo systems share some signal bands. For example, GPS L1 and Galileo E2-L1-E1 share the same band by using a specific modulation scheme, such as Binary Offset Carrier (BOC) modulation, to avoid interference.

A receiver receives the GNSS signals of various bands and down converts the signals to baseband signals. An RF front end of the receiver usually utilizes the down conversion method or direct digitization method to down convert the RF signals. In a conventional down conversion method, one local oscillator, one mixer and ADC (analog-to-digital converter) are needed for signals of one band. The cost is significantly high. To solve this problem, the direct digitization method is adopted. In the direct digitization method, a sampling frequency is selected to down convert the RF signals of various bands. However, the selection of the sampling frequency is sometimes difficult to accomplish. In addition, as mentioned, a special modulation such as BOC is applied to avoid interference and GNSS signals are spread with different PRN codes, however, a problem of SNR (Signal-to-Noise Ratio) degradation will still occur due to cross correlation noise if the bands of the down converted signals are overlapped.

SUMMERY OF THE INVENTION

The present invention is to provide a method of direct RF digitization for multiple RF signal bands such GNSS and other wireless communication signal bands. By using the method, an optimal sampling frequency to be used in direct RF digitization for signals of multiple RF signal bands can easily be obtained. In addition, overlapping between down converted signal bands can be avoided. According to the method of the present invention, one or more specific bands are shifted to target band(s), which are properly predetermined, so that the optimal sampling frequency can easily be calculated. Then the obtained sampling frequency is used in executing the direct RF digitization.

The present invention further provides a receiver with an RF front end for receiving RF signals such as GNSS or wireless communication signals. The receiver shifts one or more specific input bands to target bands, and then performs direct RF digitization with a sample frequency calculated based on the shifted and non-shifted bands, so as to down convert the various bands without overlapping.

BRIEF DESCRIPTION OF THE DRAWINGS

The present invention will be further described in details in conjunction with the accompanying drawings.

DETAILED DESCRIPTION OF THE INVENTION

Figure 1:
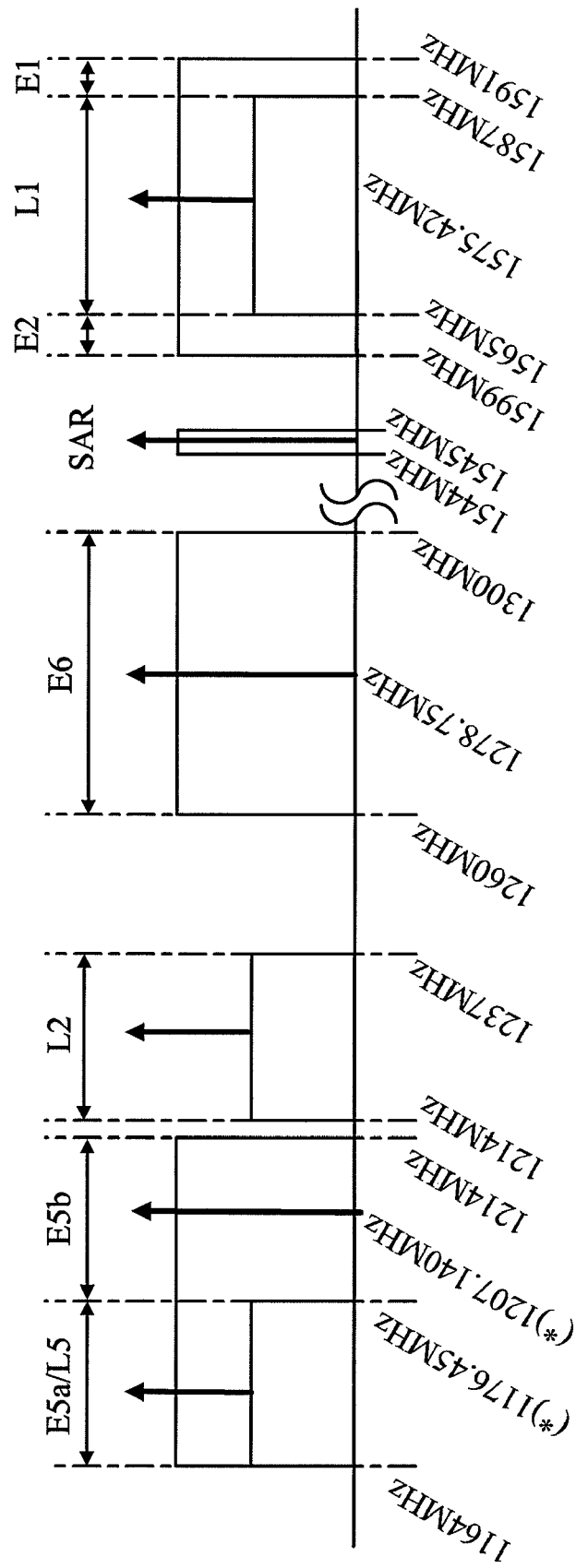
FIG. 1 is a schematic illustration showing GPS and Galileo band distribution.

Direct RF digitization is a proper scheme to down convert multiple signal bands at the same time. Direct RF digitization does not need plenty of analog components such as local oscillator (LO), mixer, etc. In direct RF digitization, a shared ADC (analog-to-digital converter) is used to sample a plurality of RF signals with a sampling frequency so as to down convert the RF signals into IF (intermediate frequency) signals. Generally, the down-converted IF signals almost fall in basebands and will be actual baseband signals after IF wipe-off processing. However, there exist some constraints in determining the sampling frequency of the shared ADC.

To implement the direct RF digitization, an optimal sampling frequency is required. By using the optimal sampling frequency in the shared ADC, all input signal RF bands can be converted to IF bands simultaneously without overlapping each other. However, under some conditions, the sampling frequency calculated based on the RF bands may be too high, therefore resulting in increase of hardware cost. In worst case, the acceptable sampling frequency is even non-available.

Theoretically, the minimum sampling frequency can be selected as the sum of the signal bandwidths multiplied by 2.5. However, to avoid occurrence of overlapping, sometimes the practical minimum sampling frequency has to be selected as a higher frequency.

TABLE 1

GPS & Galileo band carrier frequency and bandwidth list

| Frequency-band | Carrier Frequency ($f_c$) MHz | Transmitted Bandwidth (BW) × 1.023 MHz |
|---|---|---|
| L1 (GPS) | 1575.42 | 2 |
| E1-L1-E2 (Galileo) | 1575.42 | 40 |
| L2 (GPS) | 1227.6 | 2 |
| L5 (GPS) | 1176.45 | 20 |
| E5A (Galileo) | 1176.45 | — |
| E5B (Galileo) | 1207.14 | — |
| E5A + E5B (Galileo) | 1191.795 | 90 |
| E6 (Galileo) | 1278.75 | 40 |

TABLE 2

Theoretical and practical sampling frequencies of various band combinations

| Band combination | Nyquist min. fs | Calculated suitable min. fs |
|---|---|---|
| L1 + L2 | (2 + 2) × 2.5 = 10 | min. Fs = 10.8 |
| E1 + L2 | (40 + 2) × 2.5 = 105 | min. Fs = 106.4 |
| E1 + E6 | (40 + 40) × 2.5 = 200 | min. Fs = 200 |
| E1 + E5 | (40 + 90) × 2.5 = 325 | min. Fs = 495.14 * |
| E1 + E6 + L2 | (40 + 40 + 2) × 2.5 = 205 | min. Fs = 206.8 |
| E1 + E5 + E6 | (40 + 90 + 40) × 2.5 = 425 | min. Fs = 531.96 * |
| E1 + E5 + E6 + L2 | (40 + 90 + 40 + 2) × 2.5 = 430 | min. Fs = N/A * |

Table 1 shows carrier frequency and transmitted bandwidth of each frequency band of GPS and Galileo systems. Table 2 shows Nyquist minimum sampling frequency fs and practically calculated minimum fs for each band combination. As shown, if the band combination is E1+E5, that is, these two bands are to be used, the calculated minimum fs is 495.14 MHz, which is about 170 MHz higher than the theoretical value of 325 MHz. If the band combination is E1+E5+E6, the calculated minimum fs is 531.96 MHz, which is about 107 MHz higher than the theoretical value of 425 MHz. If the band combination is E1+E5+E6+L2, the suitable fs is not even available to be under the value of 1.5 GHz.

Figure 2:
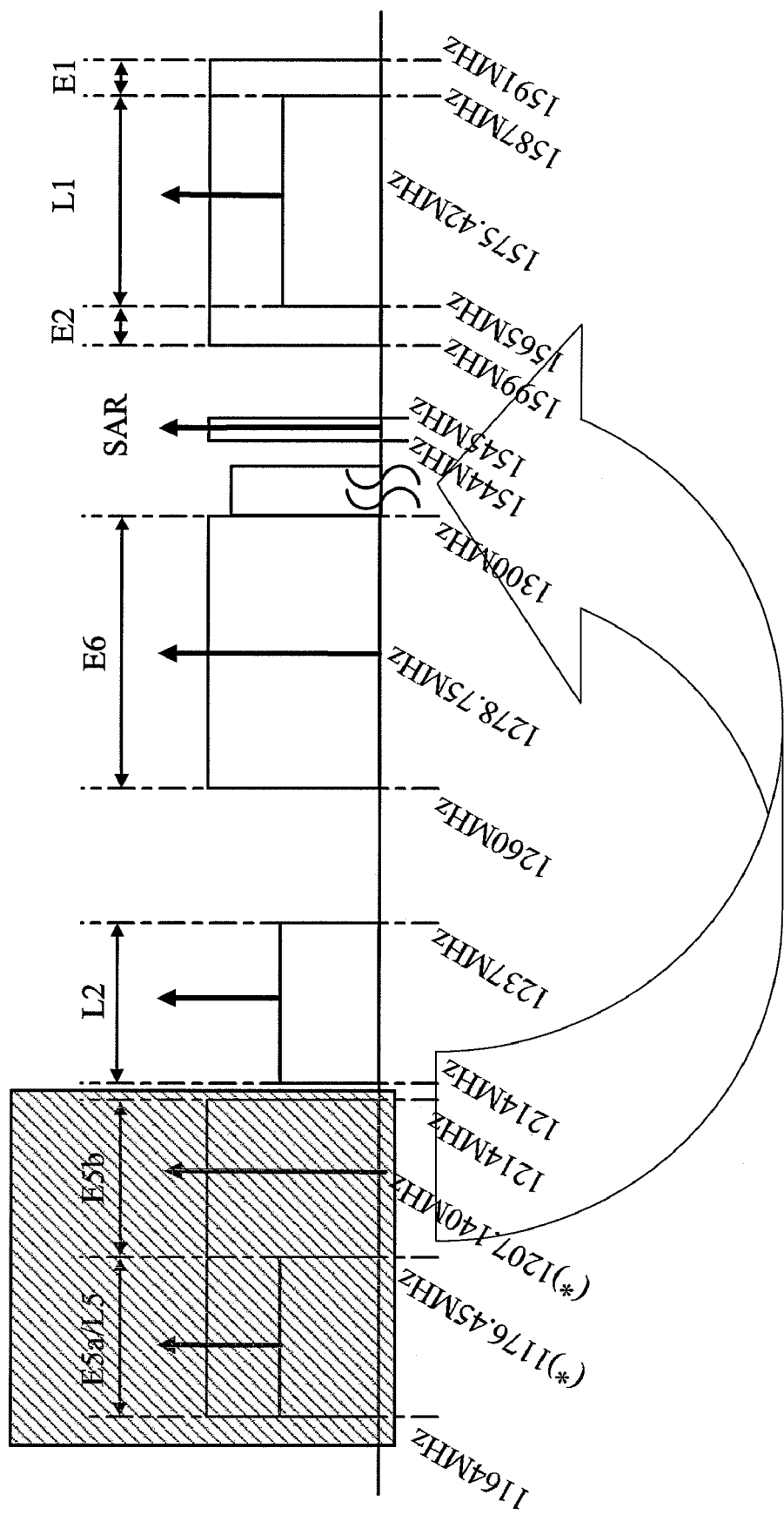
FIG. 2 is a schematic illustration showing that E5 band is shifted to a band near SAR.
Figure 3:
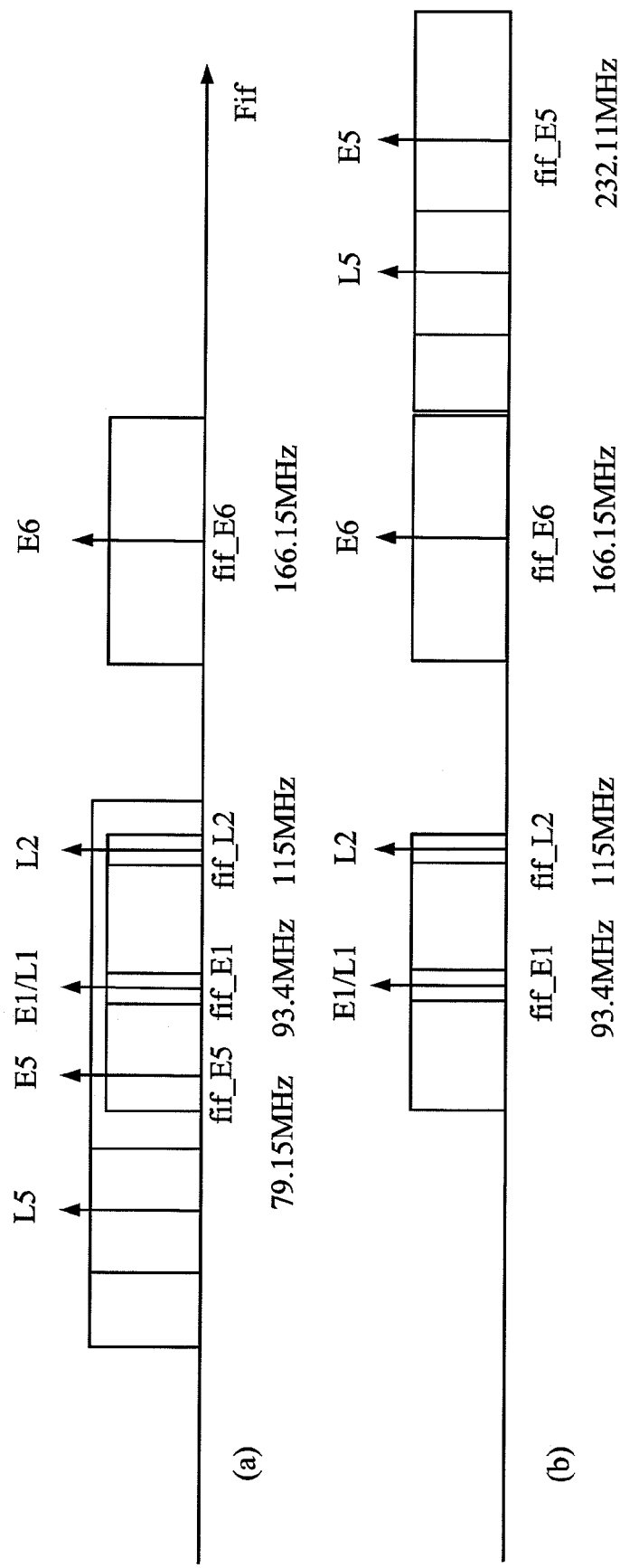
FIG. 3($a$) is a schematic illustration showing a down-converted band distribution of a band combination E1+E5+E6+L2 without frequency shifting, while FIG. 3($b$) shows a down-converted band distribution of the same band combination with E5 band being frequency-shifted.

The present invention provides a method, by which a suitable sampling frequency, which is sufficiently low, for multiple signal bands can be easily obtained. Taking the band combination E1+E2+E5+E6 as an example, if E5 band is properly shifted, as shown in FIG. 2, the optimal sampling frequency can be obtained. Such shifting should be done under consideration of avoiding overlapping. The down-converted band distribution is shown in FIG. 3(a). The central frequencies of the respective down-converted bands are fif_E1=93.4 MHz, fif_L2=115 MHz, fif_E5=79.15 MHz, and fif_E6=166.15 MHz. As can be seen, the down-converted band of E5 overlaps with the down-converted band of E1/L1 and L2. If the band of E5 is shifted so that the central frequency thereof is fif_E5=232.11 MHz, as shown in FIG. 3(b), then the overlapping can be prevented. To achieve the down-converted band distribution shown in FIG. 3(b), the band of E5 is converted to 1344.71 MHz before calculating the sampling frequency. If the central frequency of E5 band is shifted to 1344.71 MHz, then the sampling frequency fs for this band combination E1+E2+E5+L2 can be selected as 556.3 MHz.

Similarly, for the band combination of E1+E5, if the E5 band is previously shifted to 1091.295 MHz (fc), and then calculation is executed to find the optimal sampling frequency, the obtained minimum sampling frequency fs can be selected as 325 MHz instead of 495.14 MHz. A decrease of 170 MHz is achieved. If the sampling frequency fs is 325 MHz, the central frequencies of the down-converted E1 and E5 band will be fif_E1=49.58 MHz and fif_E5=116.295 MHz, respectively. The down-converted E1 band and E5 band, of which the RF band has been shifted, will not overlap with each other.

Figure 4:
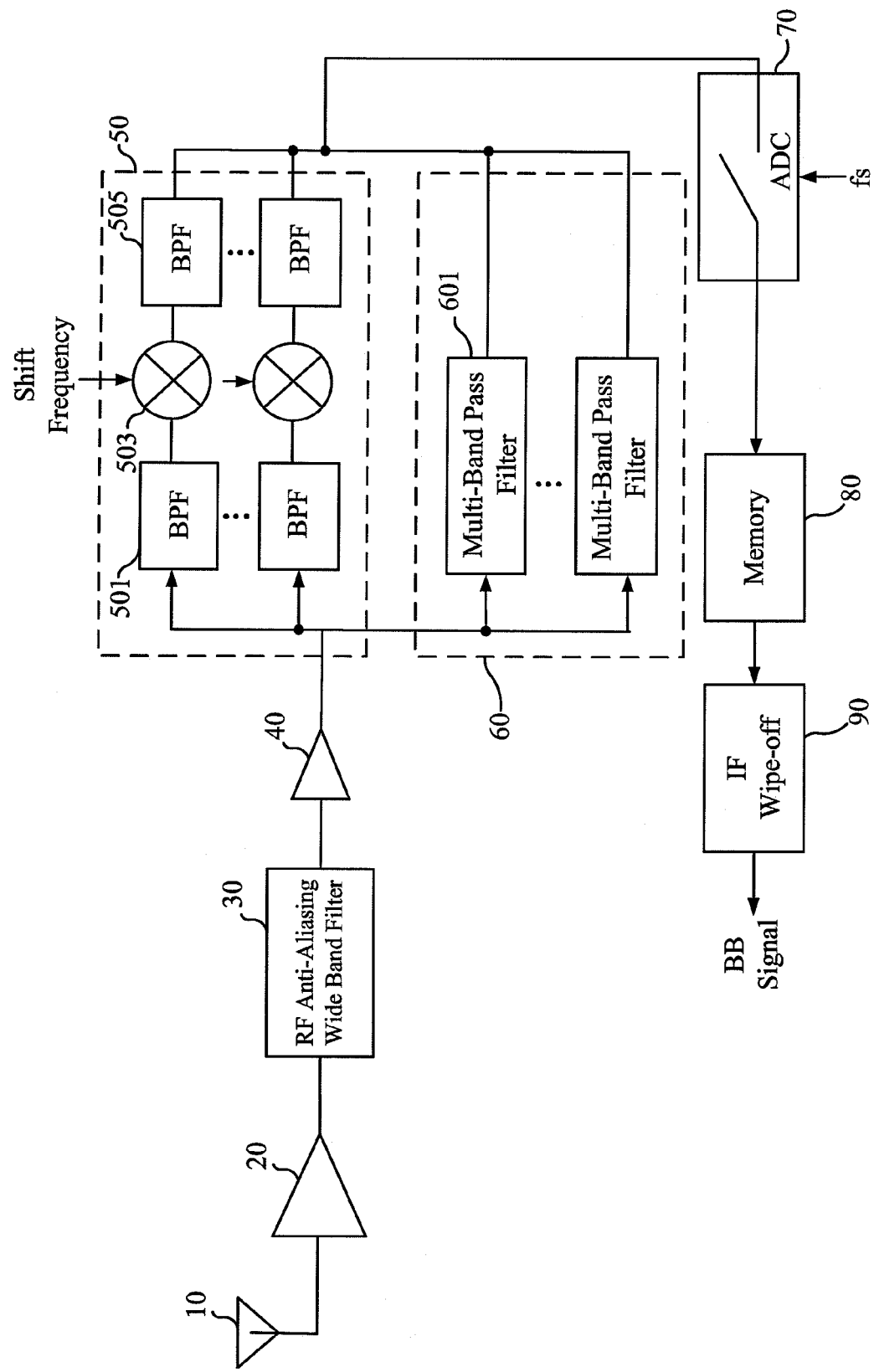
FIG. 4 is a block diagram schematically and generally showing an RF front end of a receiver in accordance with the present invention.

FIG. 4 is a block diagram schematically and generally showing an RF front end of a receiver in accordance with the present invention. The RF front end of the receiver in accordance with the present invention includes an antenna (or a group of antennas) 10 to receive satellite signals of various bands, an RF amplifier 20 to amplify the received signals, an RF anti-aliasing wideband filter 30 to rectify the amplified signal and filter off noises mixed up with the signals, and an amplifier 40 to amplify the rectified and filtered signals. According to the present invention, prior to an ADC (analog-to-digital converter) 70, by which the direct RF digitization is performed, two paths, a frequency shifting BPF (band pass filter) block 50 and direct BPF block 60, are provided. The direct BPF block 60 allows input signals of bands which need not to be frequency shifted to respectively pass to the successive stage. In the present embodiment, the direct BPF block 60 has a plurality of multi-band BPF's 601, each of which allows signals of one band, such as E1 band, to pass. The frequency shifting BPF block 50 allows signals of bands which need to be shifted to pass and be shifted to predetermined frequency bands, respectively. Some of the GNSS RF bands are selected to be shifted, for example, E5 band, based on analysis for down converted band distribution in advance. The frequency shifting BPF block 50 allows each of the selected bands to pass and shifts the passing band with an original central frequency to a target band with a predetermined new central frequency.

Here the band combination E1+E5+E6+L2 is described as an example. As described above, if the E5 band is properly shifted, a suitable sampling frequency, which is satisfactorily low, can be easily obtained. The frequency shifting BPF block 50 allows signals of the E5 band with the original central frequency fc of 1191.795 MHz (Table 1) to pass, and executes frequency shifting to the signals so as to shift the E5 band to a target band with a new central frequency fc of 1344.71 MHz. The signals of the shifted band are then passed to the ADC 70. In addition, signals of other bands (E1, E6 and L2) pass through the direct BPF block 60 and are conveyed to the ADC 70. Since E5 band has been properly shifted, the optimal sampling frequency fs can be calculated, 556.3 MHz in this example. The sampling frequency fs is provided to the ADC 70, so that the ADC 70 can execute the digitization with the sampling frequency fs. In the present embodiment, the central frequency fc of each target band and the sampling frequency fs for each possible band combination are calculated in advance and the hardware is designed according to the calculated values. However, it is also possible to dynamically calculate and determine the values for a specific band combination by means of a processor (not shown), for example. The processor then controls the frequency shifting BPF block 50 and the direct BPF block 60 based on the determined values for the specific band combination.

The digitized signals output from the ADC 70 almost fall in basebands. Those signals are stored in a memory 80 and processed into bandband (BB) signals by an IF wipe-off block 90.

It is noted that the selection of bands and the number of bands of a band combination as well as the selection and number of bands to be separately manipulated with frequency shifting are all flexible. However, bandwidths and distribution of all the bands should be taken into consideration. By previously shifting one or more specific bands to predetermined target band(s), the present invention makes it possible to calculate a sufficiently low sampling frequency for direct RF digitization of any band combination without significant increase of cost and hardware complexity. In addition, the resultant IF bandwidth distribution is optimized.

The example of utilization of the GPS and Galileo systems is described as an example. However, the present invention is also applicable to other RF signal systems such as other GNSS systems or wireless communication systems (e.g. mobile phone) and the like.

While the preferred embodiment of the present invention has been illustrated and described in details, various modifications and alterations can be made by persons skilled in this art. The embodiment of the present invention is therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. A method of direct digitization for signals of a plurality of radio frequency (RE) signal bands, used in a receiver, said method comprising steps of:
    receiving signals of the Global Navigation Satellite System (GNSS) or wireless communication bands with the receiver;
    selecting a specific one of the bands with the receiver;
    shifting the specific band to a predetermined target frequency band with the receiver;
    calculating a sampling frequency for the shifted band and other bands not shifted; and
    performing digitization to the signals of the shifted band and other bands not shifted with the calculated sampling frequency using the receiver.

2. The method of claim 1, wherein the specific band has an original central frequency, and the specific band is shifted to the target frequency band with a new central frequency.

3. The method of claim 1, wherein the target frequency band for the specific band to be shifted to is predetermined so that IF (intermediate frequency) bandwidths down convened from the RE signal bands will not overlap with each other after being performed with digitization.

4. The method of claim 1, the target frequency band for the specific band to be shifted to is predetermined so as to minimize the calculated sampling frequency.

5. The method of claim 1, wherein the number and members of the RE signal bands are determined as desired.

6. The method of claim 1, wherein there is more than one band to be frequency shifted, and the steps of selecting and shifting are repeated for each band to be shifted before the calculating step.

7. The method of claim 1, further comprising performing IF wipe-off operation to process the digitized signals into baseband signals.

8. A receiver for receiving signals of a plurality of RF signal bands, said receiver comprising:
    a frequency shifting band pass filter (BPF) block separately shifting signals of specific ones of the RF signal bands to target frequency bands, respectively;
    a direct BPF block allowing signals of bands not to be shifted to pass, respectively; and
    an analog-to-digital converter performing digitization to the signals of the shifted and non-shifted bands with a sampling frequency calculated based on the shifted and non-shifted bands to down convert the signals.

9. The receiver of claim 8, wherein each specific band has an original central frequency, and the specific band is shifted to the target frequency band with a new central frequency.

10. The receiver of claim 8, wherein the target frequency band for the specific band to be shifted to is predetermined so that IF bandwidths down converted from the RE signal bands will not overlap with each other after digitization.

11. The receiver of claim 8, the target frequency band for the specific band to be shifted to is predetermined so as to minimize the calculated sampling frequency.

12. The receiver of claim 8, wherein the number and members of the RE signal bands are determined as desired.

13. The receiver of claim 8, further comprising an IF wipe-off block for processing the digitized signals into baseband signals.

14. The receiver of claim 8, wherein the frequency shifting block comprising a set of band pass filters allowing one specific band to pass and a mixer for shifting said specific band to the target frequency band thereof.

* * * * *